No. 716,744. Patented Dec. 23, 1902.
J. W. NICHOLAS.
REVERSIBLE GARDEN PLOW.
(Application filed Apr. 5, 1902.)
(No Model.)
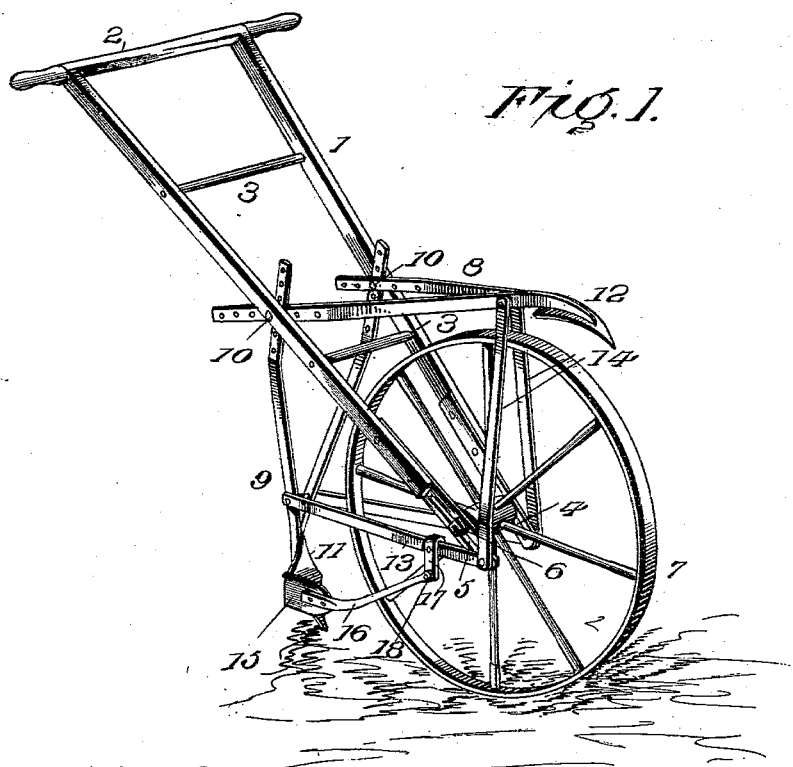
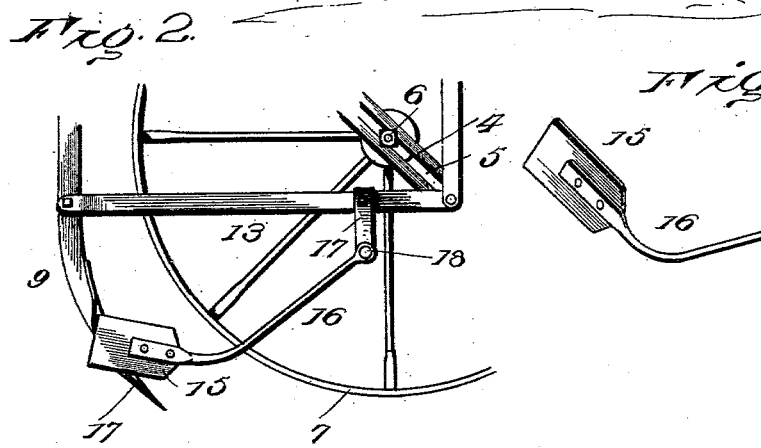
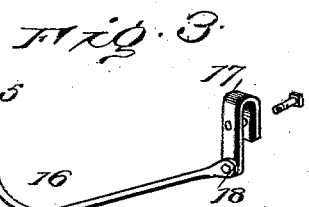
Inventor
J. W. Nicholas
Witnesses
Gladys L. Thompson.
By R. S. & A. B. Lacey Attorneys

UNITED STATES PATENT OFFICE.

JOSEPH W. NICHOLAS, OF BUFFALO, TEXAS.

REVERSIBLE GARDEN-PLOW.

SPECIFICATION forming part of Letters Patent No. 716,744, dated December 23, 1902.

Application filed April 5, 1902. Serial No. 101,557. (No model.)

*To all whom it may concern:*

Be it known that I, JOSEPH W. NICHOLAS, a citizen of the United States, residing at Buffalo, in the county of Leon and State of Texas, have invented certain new and useful Improvements in Reversible Garden-Plows; and I do hereby declare the following to be a full, clear, and exact description of the invention, such as will enable others skilled in the art to which it appertains to make and use the same.

This invention provides a walking-plow of simple and compact construction and adjustable as to depth of plowing or cultivating and to the height of the person operating the plow.

In its construction the plow comprises two standards and two shovels, the standards being disposed approximately at a right angle to one another, so as to form a counterbalance and admit of the shovel not in use being entirely out of the way.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a plow embodying the invention. Fig. 2 is a sectional detail showing clearly the fender and its mountings. Fig. 3 is a detail perspective view of the fender and the means for attachment thereof to a brace.

Corresponding and like parts are referred to in the following description and indicated in all the views of the drawings by the same reference characters.

The implement comprises handle-bars 1, diverged from their lower ends and connected at their upper ends by a cross-bar 2, forming a handle, and braced at points intermediate of their ends by cross-ties 3. In the event of the handle-bars being of wood, which is preferred, metal plates 4 are firmly attached at their lower ends and are slotted, as shown at 5, to receive the axle 6, upon which the ground-wheel 7 is mounted, said axle being adjustable in the slots 5 to admit of raising and lowering the handle-bars, as may be desired. Standards 8 and 9 are located the one in front of and the other in the rear of the handle-bars, and their upper end portions cross and are adjustably connected to the said handle-bars by means of bolts 10, passed through transversely-alined openings in the handle-bars and through selected openings of a series of openings provided in the upper end portions of the members or side bars comprising the standards 8 and 9. The standards 8 and 9 are of forked construction, each being composed of bars secured at one end and having their opposite ends spread. Shovels 11 and 12 are secured to the outer or lower ends of the standards 8 and 9 and may be of any pattern or design, according to the nature of the work to be performed. One of the shovels is preferably of the cultivating type and the other of a construction to admit of opening a furrow. Braces 13 and 14 connect the lower or outer ends of the standards 8 and 9 with the lower ends of the handle-bars or their metal extensions, a pair of braces being provided for each of the standards. A fender is provided for coöperation with each of the shovels, and consists of a plate 15, curved bar 16, and clip 17, the latter having its bent ends embracing one of the braces 13 or 14 and bolted thereto and having the front end of the curved bar 16 secured by a bolt to its pendent end, the plate or fender 15 being connected to the rear end of the curved bar 16, so as to admit of the fender being turned upon the pivot-fastening 18.

The plow is used by being trundled over the field, the depth of penetration of the shovel being regulated by raising or lowering the handle-bars at their upper rear end. By having the handle-bars adjustably connected with the axle of the ground-wheel and the plow-standards adjustably connected with the handle-bars the plow may be readily adjusted to admit of its convenient use by a person of any height. This is of great advantage in order to obviate fatigue and enable the operator to walk in an upright position without necessitating the person to assume a cramped or stooping position in order to manipulate the plow to cause the shovel to enter the earth to the required depth.

Having thus described the invention, what is claimed as new is—

1. In a walking-plow, handle-bars, standards extended in the front and in the rear of the handle-bars and provided with shovels, the upper ends of the standards being crossed and adjustably secured to each other and to the handle-bars by the same fastening means, braces secured at one end to the shovel ends of the standards and at the other to the ends of the handle-bars, the lower ends of the said handle-bars being provided with longitudinal slots located between the lower extremity of the bars and the point of securement of the standards to the said bars to allow for adjustment of the ground-wheel along the bars, substantially as set forth.

2. In a walking-plow, handle-bars provided with a ground-wheel, standards extended in the front and in the rear of the handle-bars and provided with shovels, said standards having their upper ends crossed, and means for adjustably connecting the standards to one another and to the handle-bars, substantially as set forth.

In testimony whereof I affix my signature in presence of two witnesses.

JOSEPH W. NICHOLAS. [L. S.]

Witnesses:
 W. T. CURTIS,
 L. G. HARDEE.